Jan. 31, 1928.
W. S. PRITCHARD
1,657,586
COMBINED MEASURING VALVE AND SHACKLE BOLT
Filed Feb. 1, 1926
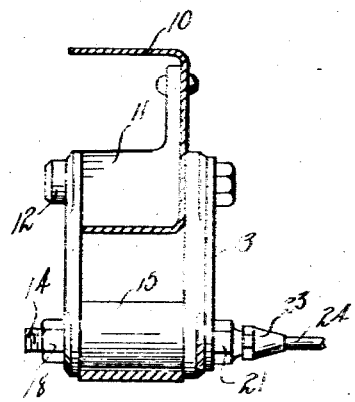
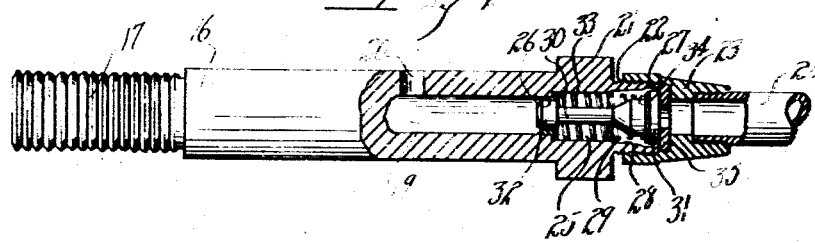
Inventor
William S Pritchard Patented Jan. 31, 1928.

1,657,586

UNITED STATES PATENT OFFICE.

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK.

COMBINED MEASURING VALVE AND SHACKLE BOLT.

Application filed February 1, 1926. Serial No. 85,275.

This invention relates to shackle bolts and the like and more particularly to a combined shackle bolt and measuring valve.

The invention is particularly adapted for use in connection with systems of lubrication wherein the lubricant is supplied under pressure and through several main conduits connected by a plurality of branch conduits to a plurality of bearings or the like. In this character of lubricating systems lubricant is supplied successively to the bearings, beginning usually with the most remote bearing and continuing successively with the nearer bearings as the preceding one has received a full charge of lubricant.

In practice, however, it has been found that in such systems of lubrication, where one of the bearings has become loose or damaged, that the lubricant instead of accumulating and filling the bearing escapes so that all or a greater part of the lubricant in that particular branch of the system escapes through the damaged bearing with the result that none is conducted to the remaining bearings connected thereto in series.

In accordance with the present invention I provide a measuring valve associated with and forming a part of a shackle bolt and so designed that upon the reception of a predetermined amount of lubricant the valve moves to a position cutting off any further supply of lubricant thereto so that the successive bearings or points of distribution connected to that branch of the system may be successively supplied with lubricant in the aforesaid manner.

The invention has therefore as one of its principal objects to provide an improved shackle bolt capable of use in connection with the above described types of lubricating systems and designed to overcome the objections aforesaid by permitting the reception of a predetermined amount of lubricant on each lubricating operation.

The invention has also among its objects to simplify, render more efficient, and improve generally devices of this character, and the above as well as other objects, advantages, and novel details of construction will be made more apparent as this description proceeds, especially when considered in connection with the accompanying drawings wherein Fig. 1 is an elevation of a shackle bolt constructed in accordance with this invention associated with a spring shackle;

Fig. 2 is a view partly in elevation and partly in longitudinal section of my improved shackle bolt; and Fig. 3 is a similar view with the parts of the measuring valve in a different position.

Referring now to the drawings and more particularly to Figure 1, it will be noted that there is illustrated in cross section a channeled metal side frame member 10 of a vehicle provided with a block 11 forming a bearing for a shackle bolt 12 which, together with links 13 and shackle bolt 14, constitute the support for the end of spring 15. Either or both of the shackle bolts 12 and 14 may be constructed in accordance with this invention and obviously the type of spring shackle employed may also be altered if desired.

In Figures 2 and 3 the shackle bolt is shown removed from the previously described structure and as shown constitutes a body portion 16 threaded as at 17 for the reception of a nut 18. The shackle bolt is provided with a longitudinal bore 19 which communicates by one or more lateral openings 20 with the surface of the bolt upon which the end of the spring 15 is mounted. Thus the lubricant contained in the bore 19 may escape through opening 20 to lubricate the engaging surfaces of the shackle bolt and spring.

The shackle bolt is preferably headed as at 21 and provided with external threads 22 for engagement by an internally threaded sleeve or nipple 23 to which a lubricant supply tube or conduit 24 is threadedly connected.

The end of the shackle bolt is formed with a chamber 25 which communicates with bore 19 by means of a restricted opening, through a bushing 25' forming a valve surface 26. This bushing 25' is seated on the shoulder 26' provided by reason of the difference between the diameters of the bore 19 and chamber 25. The larger diameter of the bore 19 beyond the bushing 25' provides a clearance chamber for a valve piston yet to be described. The chamber at the end adjacent the sleeve 23 is formed with a portion 27 of a relatively large diameter providing a clearance chamber and immediately adjacent this portion the diameter of the chamber is reduced to provide a portion constituting a valve surface 28. The wall of the chamber adjacent one end of the valve surface 28 is shouldered circumferentially to form a valve seat 29.

A reciprocal valve member 30 is arranged in the chamber 25 and is provided with valve heads 31 and 32 formed respectively on the ends of the stem of the valve. The heads 31 and 32 are of different diameters but of diameters which coincide respectively with the diameters of the valve surfaces 28 and 26. Consequently when head 31 is coincident with valve surface 28 the passage of the lubricant through chamber 25 is checked, and the passage of the lubricant through chamber 25 is also checked when the head 32 is coincident with valve surface 26. In the first instance communication between chamber 25 and the source of supply is intercepted, and in the second instance communication between bore 19 and chamber 25 is cut off.

Surrounding the stem of the reciprocal valve member 30 is a coil spring 33 which bears on the one hand against a shoulder 34 formed in the wall of chamber 25, and on the other hand against the shoulder formed by head 31. This spring normally urges reciprocal valve member 30 toward the right as seen in Figures 2 and 3 of the drawings to a position where it engages a washer 35 preferably arranged between the end of the shackle bolt and an internal shoulder formed on sleeve 23.

In practice lubricant will be supplied under pressure through conduit 24 and this lubricant will engage head 31 to move reciprocal valve member 30 toward the left as viewed in Figure 2, to open the inlet whereupon the lubricant may pass around the head between it and the portion 27 of the chamber 25 and therefore enter the chamber 25. During the initial movement of reciprocal valve 30 head 32 is still in operative engagement with valve surface 26 so that the lubricant is trapped within the chamber 25 and only a measured quantity, that is an amount equal to the capacity of chamber 25 as defined by the distance between heads 31 and 32, can later flow into the shackle bolt.

During the continued movement of reciprocal valve as occasioned by the pressure of the lubricant on the head 31 thereof and the accumulated pressure on head 32, the valve moves to a position where head 31 comes into operative engagement with the valve surface 28, subsequently valve head 32 moves out of engagement with valve surface 26 into the clearance space provided by reason of the larger diameter of the bore 19. Head 31 is transiently in engagement with valve surface 28 until this head seats on circumferential valve seat 29, at which time head 32 has moved freely into bore 19 of the shackle bolt. At the moment head 31 comes into engagement with valve surface 28 head 32 has moved out of engagement with valve surface 26 so that from this point on to the moment at which valve head 31 seats on valve seat 29 the contents of chamber 25 are forcibly expelled into bore 19 owing to the accelerated movement of the valve member resulting from the transference of the entire lubricant pressure to the larger piston 31. However, during this period communication between chamber 25 and supply conduit 24 has been interrupted. Irrespective of the length or intensity of the lubricant supply no more lubricant from conduit 24 can pass into chamber 25 until the pressure upon the lubricant supply has either been diminished or removed, whereupon valve 30 is returned to the position illustrated in Figure 1, wherein communication between bore 19 and chamber 25 is interrupted and chamber 25 is again cut off from communication with the lubricant supply in conduit 24.

From the foregoing it will be immediately apparent that the valve structure constitutes a measuring valve whereby measured amounts of lubricant are admitted to the shackle bolt and whereby, upon a further or continued supply of lubricant at that operation, the interior of the shackle bolt is cut off from communication with the source of supply and may not again receive an additional supply until the valve parts have returned to their initial position and inconsequence of a reduction of the presence on the lubricant supply.

While a specific embodiment of the invention has been illustrated herein reservation is made to make such changes in the details of construction as may come within the purview of the accompanying claims.

What I claim as my invention is:

1. A shackle bolt formed with a longitudinal bore and a lubricant measuring chamber of larger diameter communicating with said bore and providing a shoulder therebetween, a bushing seated on said shoulder and providing an outlet valve surface for said chamber, and a valve member having a head engageable with said valve surface and operable by the lubricant pressure to move the head into said bore.

2. As an article of manufacture, a shackle bolt formed with a bore and a lubricant measuring chamber of larger diameter communicating with said bore and providing a shoulder therebetween, a bushing seated on said shoulder and providing an outlet valve surface for said chamber and a clearance space in said bore, said chamber being provided with an inlet valve seat and a valve surface intermediate its length; and a valve member cooperating with said valve surfaces and seat and operable by the lubricant pressure to first open said chamber to the source of lubricant supply, then close said opening and open said outlet by moving into said clearance space.

3. A shackle bolt provided with a chamber communicating with the bore thereof and a shoulder between the chamber and bore, a bushing seated on said shoulder and forming an outlet valve surface, a measuring cylinder and a valve seat at the inlet end, a source of lubricant supply connected to said chamber and a reciprocable valve member normally engaging said valve seat to close said inlet and operable by the lubricant pressure for opening said inlet, checking the flow of lubricant to said measuring cylinder, opening said outlet and expelling the lubricant from said measuring cylinder.

4. A shackle bolt formed with a longitudinal bore connected to a source of lubricant supply, and a lubricant measuring chamber of larger diameter communicating with said bore and providing a shoulder therebetween, a bushing sleeved in said bore having a flange abutting said shoulder forming a reduced outlet valve surface, a cooperating valve member operable by the pressure at the source of lubricant supply to control and admit lubricant from said source of supply to said measuring cylinder and then expel the same into said bore and means for returning said valve to its initial position.

5. The combination with a shackle bolt having a bore, of means for automatically measuredly admitting lubricant to said bore including, a chambered portion of larger diameter than said bore formed in said bolt in communication with said bore and connected to a source of lubricant supply, a bushing sleeved in said bore forming a reduced valve surface at the outlet of said chamber and a valve surface constituting a measuring chamber; a reciprocable valve member including a valve piston working in said outlet valve surface and a second piston normally checking said inlet, whereby lubricant under pressure will move said valve member to open said inlet, and subsequently close the inlet end of said measuring chamber, open said outlet and expel said measured lubricant.

6. The combination with a shackle bolt provided with a longitudinal bore, of a lubricant measuring valve forming a part thereof and automatically operable by the lubricant pressure, said valve including a chamber formed in said shackle bolt and communicating respectively with said bore and a source of lubricant supply, a bushing positioned within said bore adjacent to said chamber and forming a reduced outlet valve surface, an inlet valve seat and a measuring cylinder formed in said chamber and a valve member cooperating with the same and operable by the lubricant pressure for measuredly admitting a quantity of lubricant and subsequently expelling said lubricant into said bore and through lateral openings formed in said bore.

In testimony whereof I affix my signature.

WILLIAM S. PRITCHARD.